United States Patent [19]

West et al.

[11] 3,837,149

[45] Sept. 24, 1974

[54] ENGINE ENCLOSURE AND COOLING SYSTEM WITH ROTARY FILTER

[75] Inventors: Neil L. West, Bettendorf, Iowa; James Roger Nelson, Geneseo, Ill.

[73] Assignee: Deere & Company, Moline, Ill.

[22] Filed: June 27, 1973

[21] Appl. No.: 374,156

[52] U.S. Cl............................ 55/269, 55/290, 55/385, 55/400, 180/54 A, 180/68 R
[51] Int. Cl............................................. B01d 46/04
[58] Field of Search ............................ 55/267–269, 55/290, 294, 293, 385, 400; 56/11.3; 180/54 A, 68 R

[56] References Cited
UNITED STATES PATENTS

| | | | |
|---|---|---|---|
| 3,002,585 | 10/1961 | Pasturczak | 55/290 |
| 3,155,473 | 11/1964 | McNeil | 55/294 |
| 3,475,883 | 11/1969 | Sullivan | 55/290 |
| 3,556,202 | 1/1971 | Stockford et al. | 55/290 |
| 3,630,003 | 12/1971 | Ashton et al. | 55/268 |
| 3,636,684 | 1/1972 | Vogelaav | 56/124 |

*Primary Examiner*—Bernard Nozick

[57] ABSTRACT

A self-propelled combine has an elevated transversely oriented engine at the right front of the machine mounted in an engine enclosure having an air inlet on the right sidewall of the enclosure. a rotating, drum-type screen is mounted over the air inlet for filtering the cooling air moving through the inlet, and a radiator is disposed adjacent to the air inlet in the enclosure. An engine driven fan pulls air through the filtered air inlet, through the radiator, and discharges a substantial portion of the air downwardly along the right sidewall of the combine, another substantial portion of the air through outlets in the lower front wall of the enclosure, directing the air along the top of the feeder house, and a smaller portion of the air through an outlet at the top of the engine enclosure front wall. A partial vacuum chamber is disposed adjacent a section of the peripheral wall of the air filter and adjacent a section of the radial end wall of the air filter, the partial vacuum being created in the chamber by suction from the fan through a conduit connecting the chamber to the fan shroud. The normal inward flow of air through the air filter is reversed in those areas of the filter opposite the vacuum chamber, so that the material filtered out of the cooling air by the filter is sucked off of the exterior of the filter into the vacuum chamber, from where it is pulled through the conduit by the fan and discharged through the air outlets, by-passing the radiator. The right sidewall of the engine enclosure is swingable to an open position wherein it provides access to the radiator and other components in the enclosure, a latch being provided to lock the sidewall in its closed position. An interlock is provided in association with the latch for automatically disengaging the drive to the rotating screen when the sidewall is swung to its open position.

22 Claims, 7 Drawing Figures

PATENTED SEP 24 1974      3,837,149

ENGINE ENCLOSURE AND COOLING SYSTEM WITH ROTARY FILTER

BACKGROUND OF THE INVENTION

This invention relates to an engine enclosure and improved means for filtering the engine cooling air moving through the engine enclosure, said engine enclosure having particular utility on agricultural harvesting machines, such as combines or the like.

It has become conventional to enclose the engines in modern combines and to mount the engine radiator within the enclosure. Since combines and the like are operated in extremely dirty and dusty conditions, it has been conventional to provide filters for filtering the cooling air drawn into the engine enclosures, so that the radiator and engine do not become covered with trash and the like. However, since the machine is working in a dirty environment, keeping the filter clean has presented somewhat of a problem, and a relatively large number of different types of devices have been designed for cleaning the air filters. One type of well known filtering system has featured the use of a rotary screen with baffles adjacent the interior side of the screen for blanking off a section of the screen as the screen rotates to cut off the inward air flow of the area of the screen opposite the baffle, so that the trash is allowed to drop off the screen.

However, the above system has not been totally satisfactory, and although some of the trash does drop off, it is frequently again picked up by the incoming air and deposited on the rotating screen. It has been proposed to positively blow off the trash rather than relying on gravity for the trash to drop off, although, again some of the trash is picked up by the incoming air after it is blown off the screen.

Another problem associated with the operation of combines is the accumulation of trash on the feeder housing. However, it is known to mount the engine in the enclosure at the right front of the combine, and further to direct some of the air discharged from the enclosure downwardly and forwardly along the top of the feeder housing, to prevent the accumulation of trash thereon.

SUMMARY OF THE INVENTION

According to the present invention, there is provided an improved engine enclosure for an agricultural machine, including improved means for filtering the engine cooling air flowing through the enclosure.

An important feature of the invention resides in the provision of a rotating screen on the engine enclosure for filtering the engine cooling air moving therethrough, and also in the provision of a partial vacuum chamber opposite a section of the rotating screen for sucking off trash and other contaminants filtered out of the intake air on the screen exterior.

Also according to the invention, the air is discharged from the engine enclosure alongside the side of the combine and along the top of the feeder housing to blow away dirt and trash, thereby preventing the accumulation of such material on the feeder house and the drives alongside the machine. Also, most of the air is discharged downwardly and away from the operator's station so that the engine heat is directed away from the operator.

Another feature of the invention resides in the fact that the rotary screen is mounted on the enclosure sidewall on the right side of the machine, and the sidewall is swingable outwardly to provide access to the radiator and other components at the right side of the engine enclosure. Also, space is provided for mounting the hydraulic oil cooler, and the heat exchanger for the cab air conditioner adjacent the engine radiator, so that the engine cooling air also cools said components.

Another feature of the invention resides in the provision of a latch for releasably locking the swingable side of the enclosure in a closed position and interlock means for automatically disconnecting the drive to the rotary screen when the side of the combine enclosure is swung to its open position.

Still another feature of the invention resides in the provision of a shield to protect the rotary screen, and in the provision of an attractive, yet simple and durable engine enclosure and air filtering system.

DESCRIPTION OF THE PREFERRED EMBODIMENT

Figure 1:
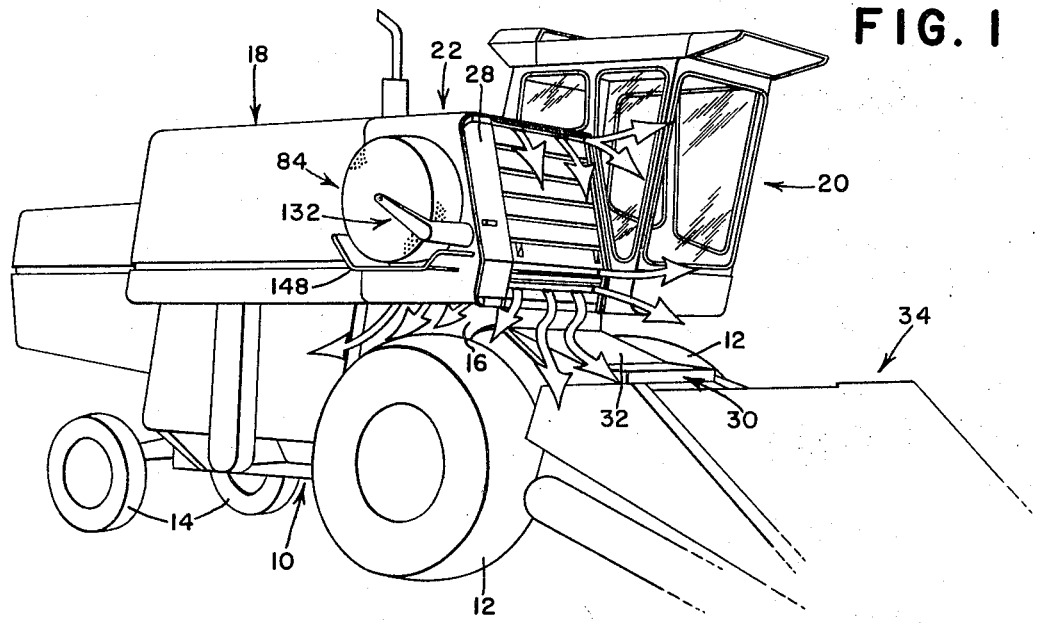
FIG. 1 is a right front perspective view of a combine including the improved engine enclosure and air filtering system, with arrows schematically illustrating the air discharge from the engine enclosure.

The invention is embodied in a self-propelled combine having a main separator body or frame 10 mounted on a pair of forward drive wheels 12 and steerable rear wheels 14. The body has generally upright sidewalls 16, and an elevated grain tank 18 is mounted on a central portion of the body, the grain tank overhanging the opposite sidewalls 16 so that the grain tank sidewalls are disposed outwardly of the body sidewall 16. An elevated operator's station 20 is disposed at the left front of the body 10 immediately in front of the grain tank, the operator's station in the illustrated embodiment including a conventional cab enclosing the operator's station. An engine enclosure, indicated in its entirety by the numeral 22, is disposed at the front of the body immediately in front of the grain tank 18 and to the right of the operator's station 20.

The engine enclosure includes a generally horizontal top 24 at the same level as the top of the grain tank, and a generally upright sidewall 26 in fore-and-aft alignment with the grain tank sidewall and outwardly of the body sidewall 16, the engine enclosure also overhanging the body sidewalls. The engine enclosure also includes a front wall indicated in its entirety by the numeral 28, the rear of the engine enclosure being formed by the front of the grain tnak, while a control console (not shown) at the right side of the operator's station is interposed between the left end of the engine enclosure and the operator's station, the terms "left" and "right" being used with reference to a person facing forwardly on the machine (to the right in FIG. 1). The general construction of the combine and the location of the engine enclosure is described in greater detail in U.S. Pat. No. 3,636,684 issued to Vogelaar et al on 25 Jan. 1972 and also assigned to the assignee herein.

As is conventional, the body has a forward crop inlet and a feeder housing 30 extends forwardly from the crop inlet below the level of the engine enclosure, the feeder housing 30 having a forwardly and downwardly inclined top wall 32. A harvesting header 34, here a corn head, only a partial outline of which is shown, is mounted on and extends forwardly from the forward end of the feeder housing 30 for removing the crop from the field as the machine advances.

A transversely oriented internal combustion engine 36 is mounted in the engine enclosure 22 and has a main output shaft extending to the left under the seat of the operator's station 20, as is well known, the engine also having an accessory drive shaft 38 extending from the opposite or right end of the engine. A generally rectangular, upright and fore-and-aft extending radiator 40 is mounted in the right end of the enclosure 22 between the right side wall 26 and the right end of the engine and includes conventional hoses 42 for conducting cooling fluid to and from the engine. The radiator is mounted on transversely extending support members 44 connected to the engine support element, as is well known, and a fan shroud 46 is disposed adjacent the left side of the radiator opposite the heat exchanger portion of the radiator between the engine and radiator, the fan shroud having a relatively large circular opening 48 opposite the radiator core. A pull-type blower or fan 50 is coaxially mounted in the fan shroud opening 48, the diameter of the fan being approximately the same as the fore-and-aft length of the radiator 40. The fan is supported on a support bracket 52 attached to the fan shroud 46 and includes a fan shaft 54 journaled in the bracket 52. A driven pulley or sheave 56 is mounted on the fan shaft 54 and a drive belt 59 is trained around the sheave 56 and a sheave 58 mounted on a transversely extending shaft 60, that is journaled in a pair of brackets 62 depending from the radiator support 44, the shaft 60 extending transversely below the radiator 40. A driven sheave 64 is mounted on the shaft 60 adjacent the sheave 58, and a drive belt 66 drives the sheave 64 from an engine driven sheave 68 on the engine shaft 38. Thus, the engine drives the shaft 60, which in turn drives the fan 50 by means of the belt 59.

Figure 2:
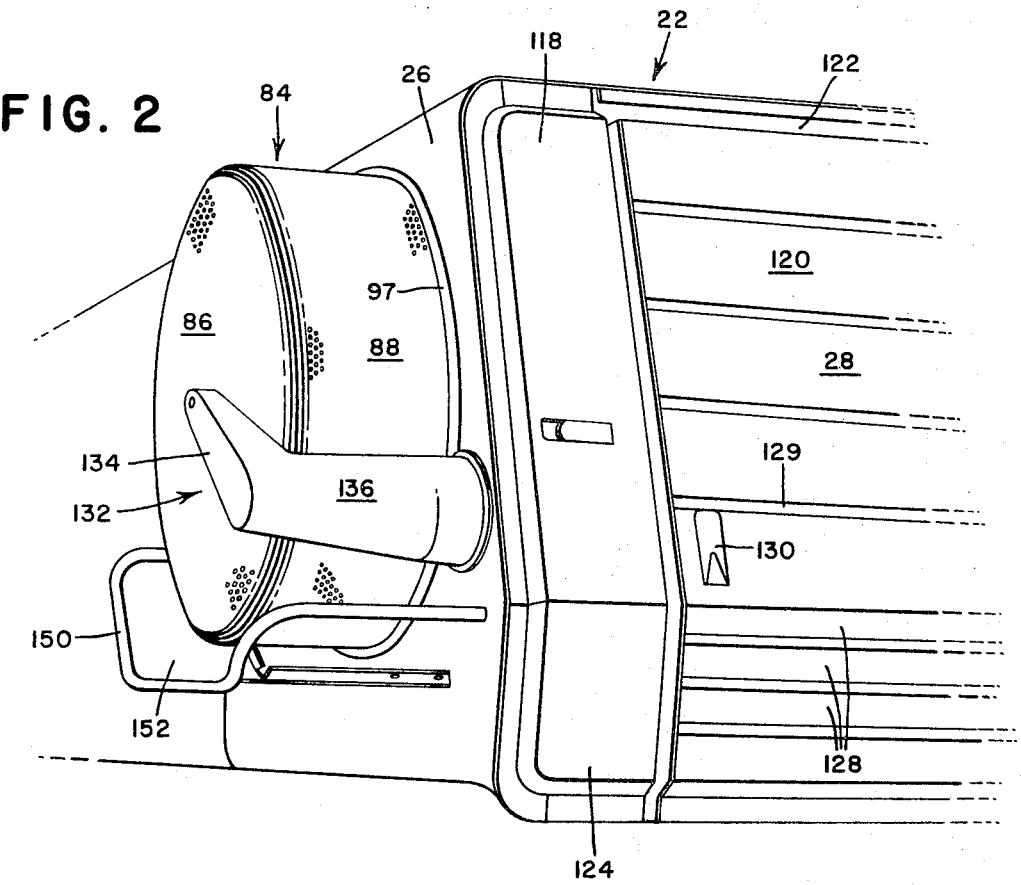
FIG. 2 is an enlarged right front perspective view of a portion of the engine enclosure showing the rotary screen.
Figure 3:
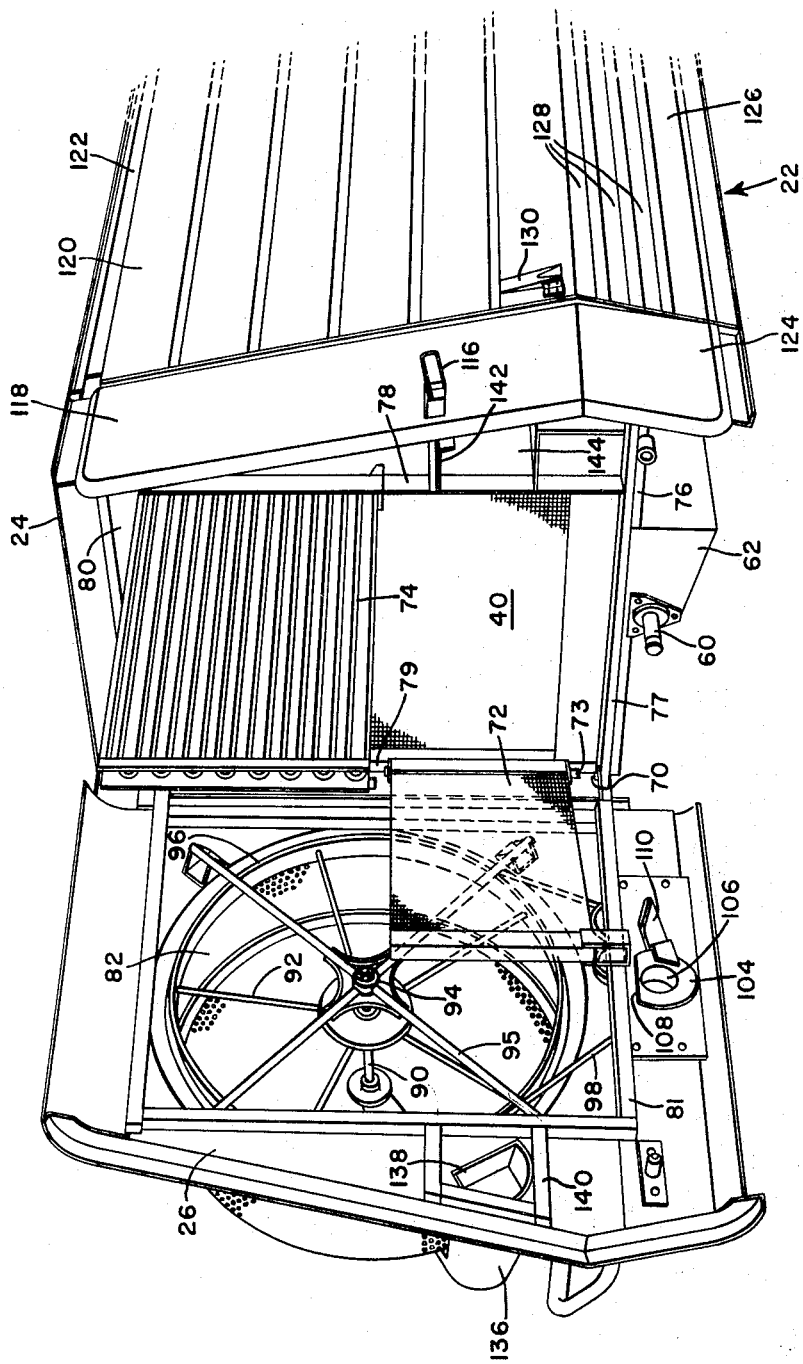
FIG. 3 is a view similar to FIG. 2, but showing the right side of the engine enclosure swung to an open position, with the air conditioner condenser and the hydraulic oil cooler also swung outwardly to expose the engine radiator.

The entire enclosure right sidewall 26 is swingable about its rearward edge on vertical pivots 70, only the lower pivot being shown in FIG. 3, the sidewall swinging from a closed position, as shown in FIG. 2, to an open position as shown in FIG. 3. Preferably, an oil cooler 72 is mounted on the right side of the radiator 40 between the radiator and the right sidewall 26 and is swingable on vertical pivot means 73 at the rear edge of the oil cooler. Similarly, an air conditioner condenser 74 is mounted above the oil cooler 72 between the radiator 40 and the enclosure sidewall and is swingable on vertical pivot means (not shown) along its forward edge. The oil cooler 72 and the condenser 74 are shown only in FIG. 3 and normally lie closely adjacent to the right side of the radiator, the oil cooler and condenser being illustrated as swung out about their pivots wherein access to the radiator is provided.

A horizontal, fore-and-aft lower enclosure frame member 76 is connected to the radiator support 44 and spans the fore-and-aft width of the enclosure along the lower edge of the radiator 40 below the oil cooler and immediately opposite the right sidewall 26. The frame member 76 has a downwardly extending lip 77 along its outer side. An upright front frame member 78 extends upwardly from the lower frame member adjacent the right front side of the radiator, the condenser 74 being pivotally connected to the front frame member, and an upright rear frame member 79 extends upwardly from the rearward end of the lower frame member along the rear side of the radiator, the oil cooler 72 being pivotally connected to the rear frame member. A horizontal, fore-and-aft top frame member 80 connects the upper ends of the upright frame member above the condenser, so that the frame members 76, 78, 79 and 80 form a rectangular, upright, fore-and-aft frame at the right side of the enclosure immediately opposite the right sidewall. The swingable sidewall 26 is provided with a rectangular seal 81 on its inner side that seats against the above-described rectangular frame around the radiator, as best shown in FIG. 3.

The right sidewall has a relatively large, circular inlet opening 82 within the area defined by the rectangular seal 81, and a rotary drum-type screen or air filter 84 is mounted over the inlet 82 and projects outwardly from the right sidewall. The screen has a foraminous radial end wall 86 and a foraminous, cylindrical, peripheral wall 88. The screen is made of metal and has closely spaced holes that are sufficiently large to pass a large volume of air while filtering out trash and other contaminants that might plug the radiator or the other heat exchangers in the engine enclosure.

The screen 84 is provided with an axial shaft 90 having its outer end connected to the end wall 86 and connected to the circumferential wall by a plurality of spikes 92. The inner end of the shaft 90 is journaled in a bearing 94 supported in the inlet of the sidewall by a plurality of brace rods 95 that connect the bearing to the sidewall.

The inner circular edge 96 of the screen's peripheral wall 88 is substantially the same size as the circular inlet 82 and is disposed on the inside of the sidewall adjacent to the inlet opening. A brush-type seal 97 is provided between the peripheral wall 88 of the rotatable screen and the sidewall 26, so that substantially all the air entering the inlet must pass through the openings in the screen.

The rotary screen 84 is rotated at a relatively slow speed, 80 rpm being illustrative of the speeds involved, and is driven by a belt 98 that is trained around the peripheral wall 88 adjacent the inner edge 96 on the inside of the sidewall 26. A belt groove 99 is provided on the outer or right end of the rotating shaft 60, and the belt 98 normally seats in the groove 99, so that the screen is driven by the shaft 60. The relatively small diameter of the groove 99 on the shaft and the large diameter of the screen, of course, creates a relatively large speed reduction to drive the screen at the relatively low speed.

Figure 6:
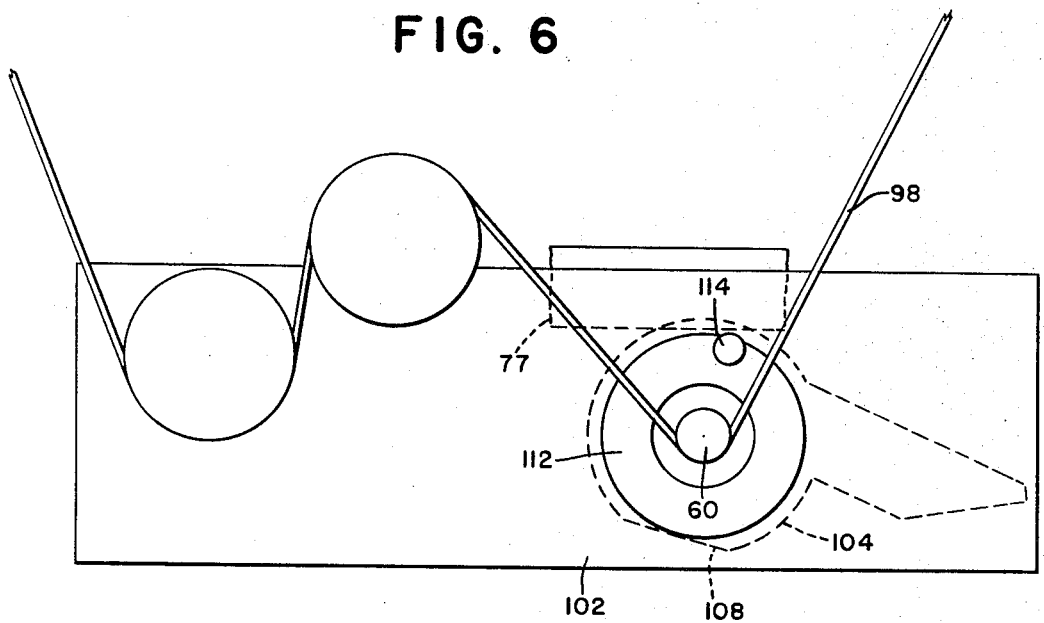
FIG. 6 is an enlarged somewhat schematic view of the latching mechanism for locking the side of the engine enclosure in the closed position, with the belt drive for the rotating screen engaged.
Figure 7:
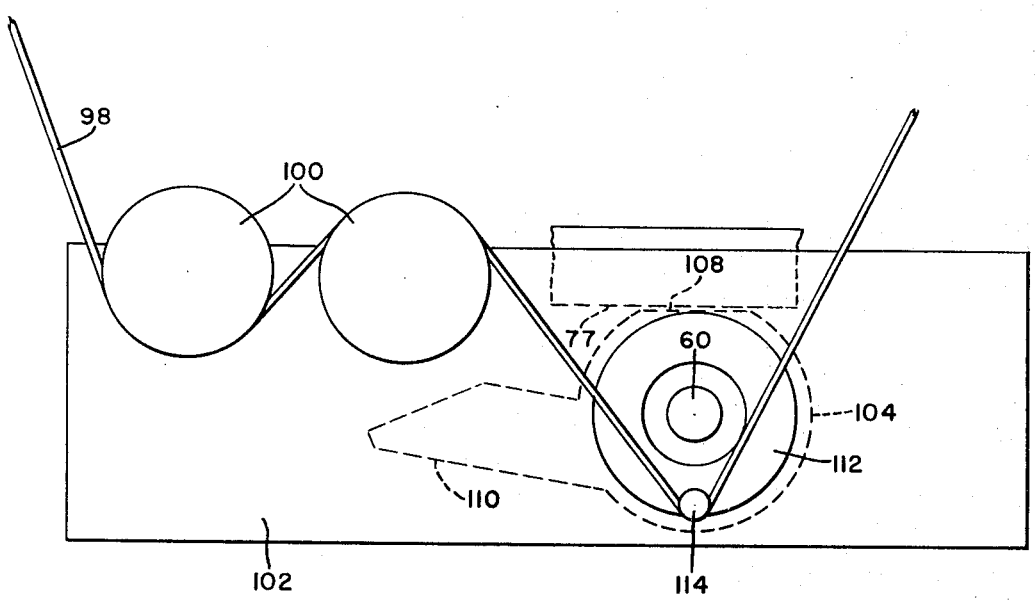
FIG. 7 is a view similar to FIG. 6 with the latch in its unlocked position and the belt drive in its disengaged condition.

A pair of spring-loaded idlers 100 are attached to a bracket 102 on a lower part of the sidewall opposite the shaft 60, the belt 98 being trained around the idlers which supply proper belt tension to the belt. An annular disk 104 having an axial sleeve 106 is journaled in the bracket 102 and has a flat 108 on one side of the disk. The disk is rotatable by means of a tangential arm 110, and when the sidewall 26 is swung towards its closed position, the disk is disposed inside the lip 77 on the lower frame member 76. As best seen in FIGS. 6 and 7, the periphery of the disk 104 is above the lower edge of the lip 77, and when the sidewall is swung to its closed position and the disk is rotated so that any area of the disk other than the flat 108 faces upwardly, the disk engages the frame member lip 77 to lock the sidewall in its closed position. However, when the disk is rotated so that the flat 108 faces upwardly, as shown in FIG. 7, the flat 108 is below the level of the lower edge of the lip, so that the disk clears the frame member lip to permit the outward swinging of the sidewall to its open condition, as illustrated in FIG. 3.

When the sidewall is swung to its closed position, the outer end of the shaft 60 extends through the sleeve 106, and an outer disk 112 is attached to the sleeve 106 on the right or outer end of the sleeve on the right side of the bracket 102. A post 114 extends outwardly from the disk 112 offset and parallel to the axis of the disk. The disks 104 and 112 are connected for rotation in unison by means of the sleeve 106, and when the disk 104 is rotated to its locking position, the post 114 is above the axis of the shaft 60, as shown in FIG. 6, the post being diametrically opposed to the flat 108. The post is disposed in the same vertical plane as the belt 98, but, as is apparent, it does not interfere with the belt when the disk 104 is in the locking position shown in FIG. 6. However, as the disk 104 is rotated towards the unlocking position, as shown in FIG. 7, the post 114 swings below the axis of the shaft 60, and as it swings downwardly it engages the belt 98 to lift the belt from the shaft groove 99, the spring-loaded idlers 100 permitting the extension of the belt. Thus, when the disk 104 is swung to unlatch the sidewall, the belt 98 is automatically disengaged from the shaft 60, the above-described interlock automatically disconnecting the drive to the rotary screen before the sidewall can be swung to its open position.

In addition to the lock afforded by the annular disk 104, an additional latch 116 is provided on the front wall to lock the sidewall 26 in the closed position. The front wall 28 includes a generally upright somewhat downwardly and forwardly inclined upper part 118, which includes a raisable door 120. The door 120 is provided with a horizontal slot-type opening 122 adjacent its upper edge, the opening spanning the width of the door and functioning as an upper air outlet. The front wall also includes a generally upright, slightly downwardly and rearwardly inclined lower part 124, most of which is formed by a lower door 126 having three horizontal laterally extending, slot-like openings 128 spanning the width of the door and functioning as a lower air outlet. The upper part of the lower door is also formed in the lower portion of the upper part of the front wall, the upper edge of the lower door being indicated by the numeral 129 in FIG. 2. A pair of latches 130 at the upper edge of the lower door releasably lock the lower door in its closed position. The lower door swings downwardly about its lower edge to provide an elevated work platform in front of the engine, while the upper door 120 swings upwardly about its upper edge to provide access to the front of the engine, the front door being pivotally connected to the engine enclosure top 24, which also swings upwardly and rearwardly about its rearward edge so as to provide better access to the engine, the general construction of the enclosure doors being substantially the same as described in greater detail in said U.S. Pat. No. 3,636,684, although the air flow through the enclosure is reversed from that described in said patent.

A generally L-shaped partial vacuum chamber 132 is mounted adjacent to the rotary screen. The inside of the vacuum chamber 132 opposite the screen is open, so that successive areas of the screen communicate with the chamber as the screen rotates. As is apparent, one leg 134 of the L-shaped chamber is disposed adjacent to the radial end wall 86 of the screen, the outer end of the radial part or leg 134 journalling the shaft 90. The other leg 136 of the chamber 132 is adjacent to the peripheral wall 88 of the screen and communicates with an opening 138 in the sidewall on the forward side of the inlet 82 below the center of the screen. As is apparent, the entire foraminous area of the screen moves past the vacuum chamber 132 during each revolution of the screen. The outer or radial leg 134 of the chamber has a generally rectangular cross section, while the peripheral part or leg 136 has an approximately semicircular cross section, and the inner edges of the vacuum chamber are disclosed closely adjacent to the screen to partially wipe the screen.

Figure 4:
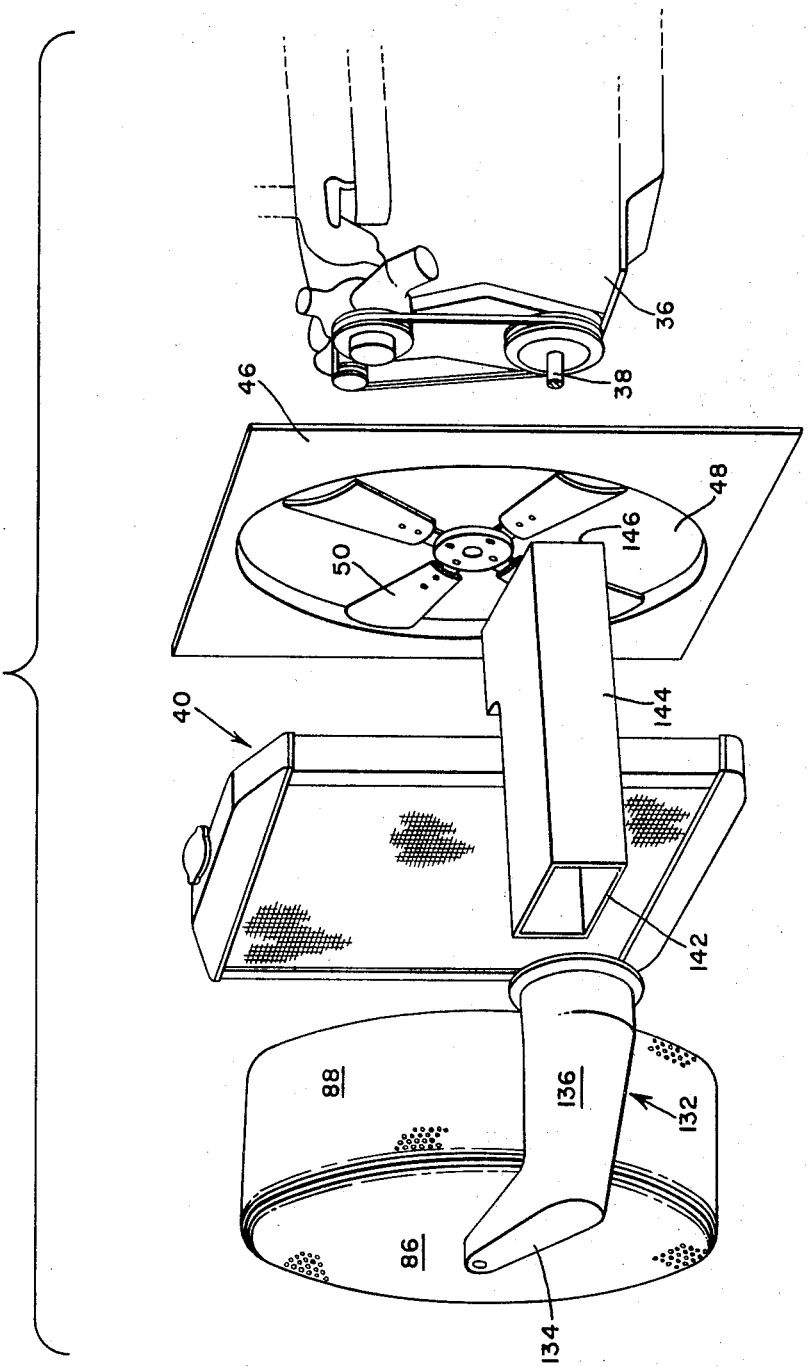
FIG. 4 is an exploded, schematic perspective of the filtering screen, the radiator, the fan, the engine, and the duct work for providing a suction or vacuum chamber adjacent the rotary screen.
Figure 5:
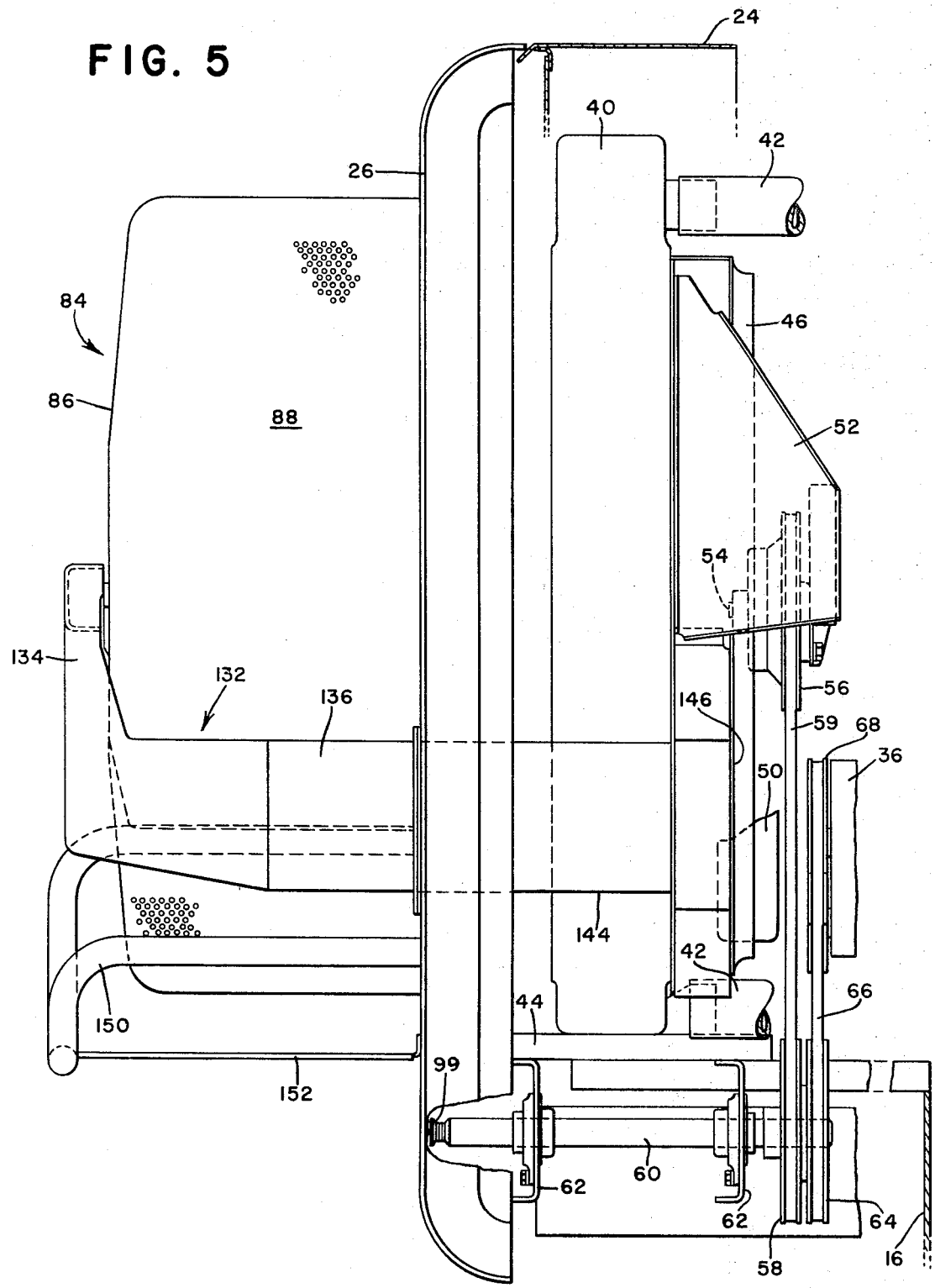
FIG. 5 is an enlarged front elevation of the right side of the engine enclosure, with portions of the enclosure broken away to show the radiator and a fan, and showing the rotating screen.

A generally trapezoidal seal 140, partly formed by the inlet seal 81 and lying in the same vertical plane as said seal, surrounds the vacuum chamber opening 138, the seal seating against the open outer end 142 of a conduit 144 that connects the vacuum chamber to the inlet side of the fan 50. The outer end of the conduit 142 has a generally trapezoidal shape that mates with the seal 140, the conduit being disposed between the front wall 28 and the radiator 40. The inner end 146 of the conduit 144 is connected to the fan shroud 46 and is provided with an opening opposite the intake side of the fan 50, so that the fan 50 draws air through the conduit and creates a partial vacuum in the vacuum chamber 132, the arrangement of the vacuum chamber, conduit 144, and fan being schematically illustrated in FIG. 4.

A shield 148 extends outwardly from the sidewall 26 below the rotating screen 84 and includes a tubular frame 150 having its opposite ends attached to the sidewall with opposite end portions projecting laterally outwardly from the sidewall and a central portion disposed below and slightly outwardly of the end wall of the screen. A panel 152 substantially fills the space between the frame and the wall and protects the screen from mud or the like thrown upwardly by the right front wheel 12.

In operation, when the engine is operating, the fan 50 pulls air inwardly through the screen 84, through the oil cooler 72 and the air conditioning condenser 74, should the combine be equipped with said accessories, and through the radiator 40, and then discharges the air into the engine enclosure past the engine 36. The screen, of course, filters the air and removes any particles that might clog the radiator or the other heat exchangers. The engine enclosure, is thus slightly pressurized by the fan and the air is discharged through the opening 122 in the top of the front wall, through the openings 128 in the bottom of the front wall, and through the gap between the combine sidewall 16 and the fan shroud, the engine enclosure having a solid floor on top of the combine body 10, while the portion of the enclosure overhanging the body is substantially open downwardly, only the radiator supporting structure and other structural elements being disposed in the gap between the engine enclosure sidewall 26 and the body sidewall 16. Thus, as best shown by the arrows in FIG. 1, a substantial portion of the air is directed downwardly along the combine sidewall immediately after it is discharged from the fan, thereby blowing trash and the like from the belt drives along the right sidewall. An additional substantial portion of the air is directed downwardly and forwardly through the outlet openings 128 immediately above the feeder housing top wall 32, the blast of air from these openings blowing dust and trash from the top of the feeder housing. Most of the remainder of the air is directed forwardly and upwardly through the outlet opening in the top of the front wall. In the preferred embodiment, approximately 40 percent of the air is directed downwardly along the sidewall of the combine, approximately 40 percent of the air is directed forwardly and downwardly along the top of the feeder housing, and the remaining 20 percent goes out the top outlet opening 122. The top outlet opening also allows the escape of residual heat from the engine enclosure after the engine stops running and the fan stops blowing the air, the hot air from the engine and radiator naturally rising to the top of the enclosure and escaping through the outlet 122 as the engine components cool down.

As previously described, the fan sucks air through the conduit 144, creating a partial vacuum in the vacuum chamber 132 so that a portion of the air that moves into the interior of the rotating screen 84 again moves outwardly through the walls of the screen in the area opposite or in communication with the vacuum chamber 132 to reverse the flow of air in said area. The reverse air flow, of course, carries with it the foreign material on the exterior side of the screen and within the vacuum chamber, and this contaminated air is routed around the radiator 40 and the other heat exchangers by means of the conduit 144, the contaminated air being discharged with the remainder of the air drawn through the radiator and heat exchangers. Thus, the air flow through each area of the screen is reversed for a short period during each revolution of the screen, so that the screen is constantly being cleaned. Of course, the relatively close proximity of the vacuum chamber edges to the screen, also scrapes off larger pieces of trash as the screen rotates.

As previously described, the swingable sidewall permits easy access to the heat exchangers at the right side of the engine enclosure for cleaning or maintenance purposes, the drive to the rotary screen being automatically disconnected before the door can be unlatched and swung to its open condition.

We claim:
1. In a self-propelled agricultural machine having a body with opposite lateral sidewalls, a forwardly extending crop feeding housing, a forward elevated engine above the level of the housing and a forward elevated operator's station adjacent the engine, the combination therewith of an improved engine enclosure and cooling system comprising: an engine enclosure mounted on the body for enclosing the engine and having an approximately upright sidewall spaced outwardly of the body sidewall on the opposite side of the machine from the operator's station, and an approximately upright front wall including upper and lower portions; an air inlet means in said engine enclosure sidewall; a rotatable air filter means including a foraminous filter element mounted on the enclosure sidewall over the air inlet means for filtering air moving through the air inlet means; drive means operatively connecting the engine to the air filter means for rotating the filter means; air outlet means in the enclosure and including a first air outlet in the lower portion of the front wall above the crop feeding housing and a second outlet open downwardly between the combine sidewall and the enclosure sidewall; heat exhcanger means mounted with the enclosure and adapted to cool the engine; blower means mounted in the enclosure and operatively connected to and driven by the engine for moving air through the filter element and at least a portion of the air through the heat exchanger means, and discharging the air through the air outlet means, at least a portion of the air moving thruogh the first and second outlet; and cleaning means for cleaning the filter elements as the air filter means rotates.

2. The invention defined in claim 1 wherein the cleaning means comprises a partial vacuum chamber disposed adjacent the filter element and having an inlet opening opposite a limited area of the filter element, said area changing as the air filter means rotates so that substantially the entire filter element moves past the inlet opening during each revolution of the air filter element, the chamber blanking off the area of the filter element opposite the inlet to interrupt the air stream moving inwardly through said area, and the partial vacuum in the chamber causing a reverse air flow through the filter element area opposite the chamber inlet opening to clean said area of the filter element.

3. The invention defined in claim 2 wherein the chamber is connected to conduit means having an opening operatively associated with the blower means so that the blower means sucks air through the conduit means to create the partial vacuum in the chamber.

4. The invention defined in claim 3 wherein the filter element is drum-shaped and includes a radial end wall offset and parallel to the enclosure sidewall and a cylindrical peripheral wall, and the chamber includes a laterally extending portion adjacent the cylindrical wall and a radial portion adjacent the end wall of the filter element.

5. The invention defined in claim 4 wherein the heat exchanger means is disposed between the air filter means and the blower means, and the conduit means extends laterally alongside the heat exchanger means to the blower means.

6. The invention defined in claim 1 wherein the enclosure sidewall includes a door swingable between a closed operating position and an open position wherein it exposes the heat exchanger means, and the air filter means is mounted on the door.

7. The invention defined in claim 6 wherein the door includes latch means shiftable between locked and open positions wherein it respectively maintains the door in its locked operating position or permits the door to swing to its open position, and the drive means to the air filter means includes a clutch means shiftable between engaged and disengaged positions wherein it respectively engages or disconnects the drive to the air filter means and operatively connected to the latch means for shifting to its disengaged condition when the latch means is shifted to its open position.

8. In an agricultural machine having a mobile body and an internal combustion engine mounted on the body, the combination therewith of an improved engine enclosure and a cooling system for the engine comprising: an engine enclosure mounted on the body and including sidewalls and a top wall; an air inlet means in one of said sidewalls; a rotatable air filter means, including a foraminous filter element mounted on the enclosure sidewall over the air inlet means for filtering air moving therethrough; drive means operatively connecting the engine to the air filter means for rotating the filter means; an air outlet means in the enclosure; heat exchanger means mounted within the enclosure and adapted to cool the engine; blower means mounted in the enclosure and operatively connected to and driven by the engine for moving air through the filter element, through the air inlet means, through the heat exchanger means, and discharging the air through the air outlet means; a partial vacuum chamber mounted on the enclosure adjacent the exterior side of the filter element and having an air inlet opening opposite a limited area of the filter element that changes as the air filter means rotates so that substantially the entire filter element moves past the inlet opening during each revolution of the filter element; and conduit means connecting the chamber to the blower means so that the blower means sucks air from the chamber, a portion of the air flowing through the filter means being sucked back through the filter means into the vacuum chamber to carry away foreign material accumulating on the exterior side of the filter means.

9. The invention defined in claim 8 wherein the heat exchanger means is disposed between the blower means and the air filter element, the conduit means extending around the heat exchanger means so that the air drawn into the vacuum chamber bypasses the heat exchanger means and is discharged through the blower means through the air outlet means.

10. The invention defined in claim 9 wherein the air filter element is drum-shaped and has a radial end wall and a vertical peripheral wall, the vacuum chamber being L-shaped and having one leg adjacent the end wall of the drum-shaped filter element and its opposite leg adjacent the peripheral wall.

11. The invention defined in claim 10 wherein at least a portion of the sidewall carrying the filter element is swingable about a vertical pivot means between a closed position wherein the engine is substantially enclosed, and an open condition wherein access is provided to the heat exchanger means.

12. The invention defined in claim 11 wherein the heat exchanger means includes a radiator operatively associated with the engine, and an oil cooler.

13. The invention defined in claim 9 wherein the enclosure includes a second sidewall and the outlet means is at least partially disposed in said second sidewall, and includes a first outlet opening at the top of said second wall and a second outlet opening in a lower portion of said sidewall.

14. In an agricultural machine having a mobile body and an internal combustion engine mounted on the body, the improvement comprising: an engine enclosure mounted on the body and substantially enclosing the engine, said engine having a first generally upright sidewall portion and vertical pivot means swingably mounting said sidewall portion on the enclosure for swinging between a closed position and an open position wherein it exposes a portion of the enclosure interior; heat exchanger means operatively associated with the engine and mounted in the enclosure adjacent and opposite the swingable sidewall portion; an air inlet in the swingable sidewall portion; a rotatable air filter means including a foraminous filter element mounted on the swingable sidewall portion over the air inlet means for filtering air moving through the air inlet means; drive means operatively connecting the engine to the air filter means for rotating the filter means; air outlet means in the engine enclosure; and blower means mounted in the enclosure and operatively connected to and driven by the engine for moving air through the filter element, through the heat exchanger means, and discharging the air through the air outlet means.

15. The invention defined in claim 14 and including latch means operatively associated with the swingable sidewall portion and shiftable between locking and unlocking positions where it respectively locks and unlocks the swingable sidewall portion to the rest of the enclosure, and means connecting the latch means to the drive means between the engine and the air filter means for automatically disconnecting the drive means when the latch is shifted to its unlocking position.

16. The invention defined in claim 14 and including a partial vacuum chamber disposed adjacent the filter element and having an inlet opening opposite a limited area of the filter element, substantially the entire filter element moving past the inlet opening of the partial vacuum chamber during each revolution of the filter element, a portion of the air moving through the filter element being drawn into the partial vacuum chamber in a reverse direction through the filter element to carry foreign material from the exterior side of the filter element into the vacuum chamber.

17. The invention defined in claim 14 wherein the heat exchanger means includes a radiator operatively associated with the engine for cooling the engine and at least one other heat exchanger for cooling a different component of the machine.

18. The invention defined in claim 14 wherein the engine enclosure includes a second sidewall and the air outlet means includes a first outlet opening at the top of said second sidewall and a second outlet opening in a lower portion of said second sidewall.

19. In an agricultural machine having a mobile body and an internal combustion engine, the combination therewith of an improved engine enclosure and cooling system for said engine and comprising: an engine enclosure mounted on the body and substantially enclosing the engine and having a first generally upright sidewall; a vertical pivot means swingably mounting the sidewall on the enclosure for swinging between a closed position and an open position wherein it exposes a substantial portion of the enclosure interior; an air inlet in the swingable sidewall; a rotatable air filter means including a foraminous filter element mounted on the swingable enclosure sidewall over the air inlet means for filtering air moving therethrough; drive means operatively connecting the engine to the air filter means for rotating the filter means; a latch means operative between the swingable sidewall and the remainder of the enclosure and shiftable between a locked position, wherein it maintains the swingable sidewall in its closed position, and an open position, wherein it permits the swinging of the sidewall to its open position; and means connecting the latch means to the drive means for automatically disconnecting the drive means when the latch means is shifted to its open position.

20. The invention defined in claim 19 wherein the drive means to the air filter means includes a drive shaft having a pulley means thereon and a drive belt engageable with the pulley to rotate the air filter means, and the latch means includes a rotatable element coaxially rotatable relative to the shaft between open and closed positions wherein it establishes the open and locked positions of the latch means, said rotatable element having a belt-engaging member offset from the axis of the shaft and engageable with the belt to lift the belt off the pulley means as the element is swung from its locked to its open position.

21. In a self-propelled agricultural machine having a body with opposite lateral sidewalls, a forwardly extnding crop feeding housing, a forward elevated engine above the level of the housing, and a forward elevated operator's station adjacent the engine, the combination therewith of an improved engine enclosure and cooling system for the engine comprising: an engine enclosure mounted on the body and substantially enclosing the engine and having an upright sidewall spaced outwardly of the body sidewall on the opposite side of the machine from the operator's station; a generally upright front wall including upper and lower portions; an air inlet means in said engine enclosure sidewall; a rotatable air filter means including a foraminous filter element mounted on the enclosure sidewall over the air inlet means for filtering air moving through the air inlet means; a drive means operatively connecting the engine to the air filter means for rotating the filter means; air outlet means in the enclosure and including a first air outlet in the lower portion of the front wall above the crop feeding housing and a second outlet open downwardly between the combine sidewall and the enclosure sidewall; heat exchanger means mounted within the enclosure and adapted to cool the engine; blower means mounted in the enclosure and operatively connected to and driven by the engine for moving air through the filter element, and at least a portion of the air through the heat exchanger means, and discharging the air through the air outlet means; a partial vacuum chamber disposed adjacent the exterior side of the filter element and having an inlet opening opposite a limited area of the filter element, substantially the entire filter element moving past the inlet opening of the vacuum chamber during each revolution of the filter element; conduit means bypassing the heat exchanger means and operatively connecting the blower means to the vacuum chamber to create a partial vacuum in said chamber, a portion of the air drawn through the filter element moving in the reverse direction through the filter element and into the vacuum chamber to carry away foreign material accumulated on the exterior side of the filter element, the foreign material entrained in the air in the vacuum chamber moving through the conduit and being discharged through the outlet means by the blower means.

22. The invention defined in claim 21 wherein the filter element is drum-shaped and has a radial end wall and a cylindrical sidewall, and the vacuum chamber is generally L-shaped and has a first leg opposite and adjacent the end wall of the filter element and a second leg adjacent and opposite the cylindrical sidewall of the filter element.

* * * * *